Figure 6:
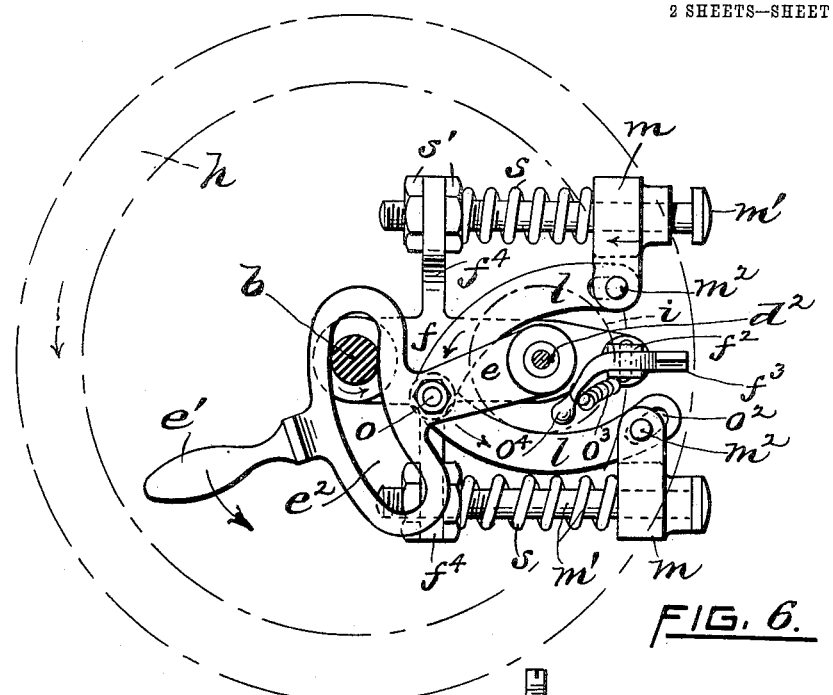

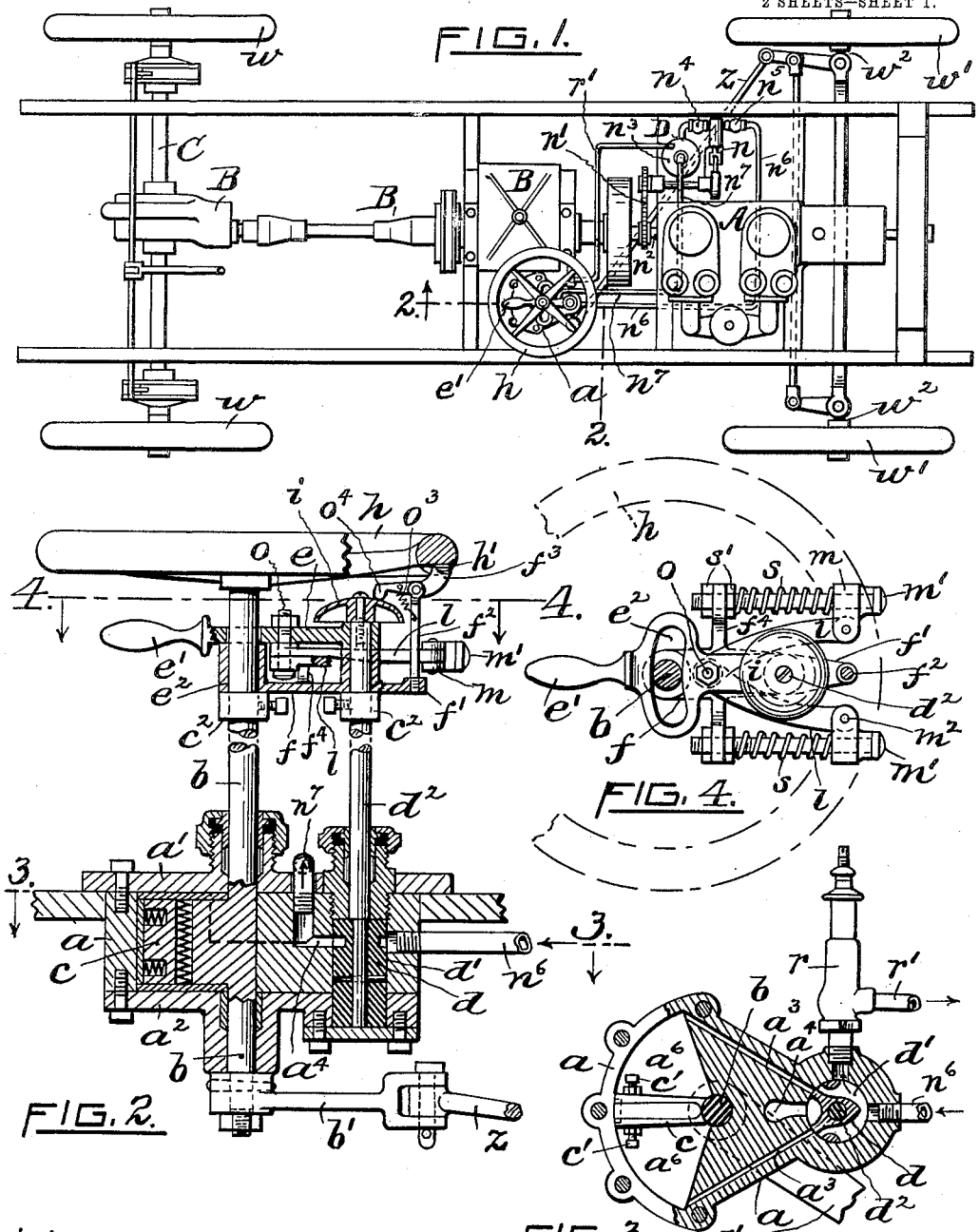

No. 827,763. PATENTED AUG. 7, 1906.
J. H. TAYLOR.
STEERING GEAR FOR SELF PROPELLED VEHICLES.
APPLICATION FILED SEPT. 15, 1905.

2 SHEETS—SHEET 2.

WITNESSES. INVENTOR.
James H. Taylor.

UNITED STATES PATENT OFFICE.

JAMES H. TAYLOR, OF PAWTUCKET, RHODE ISLAND, ASSIGNOR, BY DIRECT AND MESNE ASSIGNMENTS, OF TWO-SIXTHS TO HENRY J. BAILEY, FIFTEEN ONE-HUNDREDTHS TO HENRY S. COLE, AND ONE-SIXTH TO HUGH J. CARROLL, ALL OF PAWTUCKET, RHODE ISLAND.

STEERING-GEAR FOR SELF-PROPELLED VEHICLES.

No. 827,763.　　　Specification of Letters Patent.　　　Patented Aug. 7, 1906.

Application filed September 15, 1905. Serial No. 278,617.

*To all whom it may concern:*

Be it known that I, JAMES H. TAYLOR, a subject of the King of Great Britain, and a resident of Pawtucket, in the county of Providence and State of Rhode Island, have invented certain new and useful Improvements in Steering-Gear for Self-Propelled Vehicles, of which the following is a specification.

My invention relates to certain improvements in steering-gear for automobiles or other self-propelled motor-vehicles; and it consists in the novel construction and arrangement of the instrumentalities through which the apparatus or mechanism is adapted to be actuated to change the course or direction of the vehicle, all substantially as hereinafter set forth and claimed.

The object of the invention is to provide motor-vehicles with a power-steering gear or steering-engine actuated by fluid under pressure imparted to it, say, by the propelling mechanism, while at the same time the admission of the fluid to the said engine and its exhaustion therefrom is easily and readily effected and controlled by a manually-operated valve.

In a motor-vehicle provided with my improved steering-gear or "fluid-pressure steering-gear," as it may be termed, the steering of the vehicle may be performed by the fluid-pressure power alone and also by hand independently of or combined with the power at the will of the operator.

By means of the invention the steering is effected quickly and positively by simply manipulating the valve-lever to the right or left from the normal or central position, as occasion requires. I would further state that by using a practically inelastic or non-compressible medium under pressure in the cylinder, as oil or water, to actuate the piston, &c., the latter become fixed or locked in position for the time being or until the controlling-valve is moved or adjusted to swing the axle and its traction-wheels to another position—that is to say, the cylinder and ports or passages through which the fluid circulates, as throughout a cycle, are at all times filled with the fluid, the latter being in continuous engagement with both sides or faces of the piston. Therefore when the valve and ports are normally closed the piston is at rest and in equilibrium, since the pressure on the opposite sides thereof is the same or uniform.

I am well aware that fluid-pressure steering-engines for vessels have been devised and used prior to my present invention, said former engines being provided with swinging or rocking valves for controlling the admission of the fluid into the engine and exhausting it therefrom. In some cases the engines were also provided with means for shutting off the supply of fluid automatically at the end of each stroke of the piston in either direction.

In my invention the movements of the piston are governed by the controlling-valve, the latter being manually actuated a short angular distance in either direction from the central or closed position corresponding to the desired degree of lateral movement or change in the course of the vehicle. The valve is also self-closing and arranged to instantly and automatically return to the central position when the operator releases his hold upon the working lever thereof, the result being to maintain the piston stationary in its last-adjusted position until the valve is again opened. This automatic feature of the device is completely operative and effective at any point in the movement or stroke of the piston.

Figure 5:
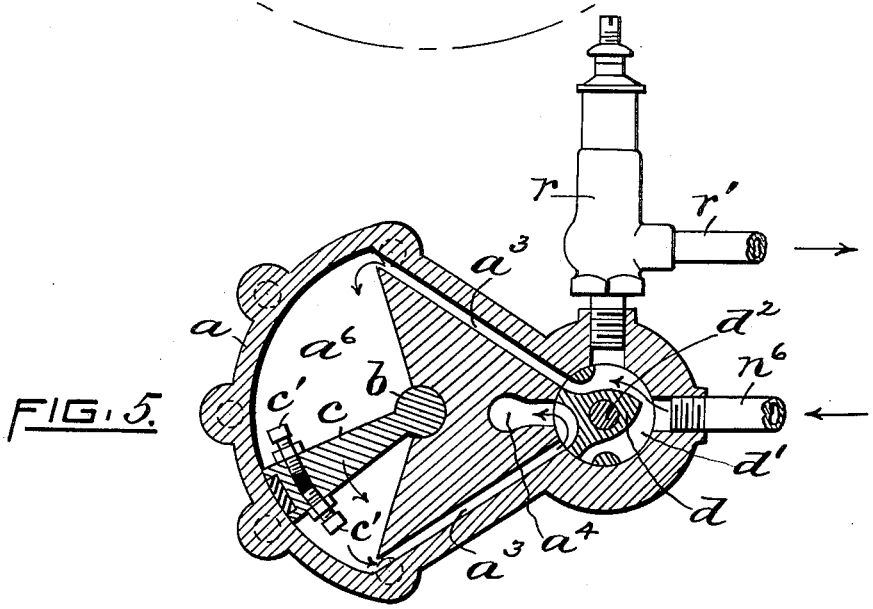

Another and very important advantage secured in automobiles provided with my invention is that it constitutes a safety device in that it prevents the thus-equipped vehicle from "skidding," as it is termed, and the disastrous results usually attending such accidents, or, in other words, it is well known that a rapidly-moving motor-carriage having the usual steering mechanism is liable to suddenly swerve from its normal course in case either of its forward traction-wheels accidentally encounters an obstruction. The immediate result of this may be to free the steering or hand wheel from the grasp of the chauffeur or operator, or the force thus suddenly imparted to the wheel may temporarily greatly exceed that exerted by the operator in his efforts to overcome it in trying to correct such abnormal action, In the two accompanying sheets of drawings, Figure 1 is a plan view of the running-gear of an automobile or motor-vehicle, showing my improvement combined with the hand steering-gear. Fig. 2 is a vertical central sectional view, enlarged, taken substantially on line 2 2 of Fig. 1, the parts being in the normally central position. Fig. 3 is a horizontal sectional view taken on line 3 3 of Fig. 2. Fig. 4 is a horizontal sectional plan view taken on line 4 4 of Fig. 2. Fig. 5 is a horizontal sectional view similar to Fig. 3, in enlarged scale, showing the position of the valve when the steering-engine is in action; and Fig. 6 is a corresponding plan view of the valve-controlling lever, &c. Upon releasing the lever the springs and connections instantly and automatically return the several parts to the central or normal position represented in Figs. 3 and 4, the wing or piston, however, remaining stationary in the position shown in Fig. 5 until the valve is again manipulated.

I would state that Fig. 1 of the drawings represents or indicates in plan a general arrangement of the running-gear and including driving-gear or mechanisms employed in automobiles or motor-vehicles, the body or tonneau being omitted.

As drawn, A indicates any suitable propelling engine or motor, its power being carried rearwardly via transmission-gear system B to revolve the rear axle C and its traction-wheels $w$. The forward traction-wheels $w'$ are or may be mounted on short axles $w^2$, jointed to swing in a horizontal plane in a well-known manner. Said members are connected so as to move in either direction in unison and are capable of being actuated by a link or rod $z$, jointed thereto and leading from the steering-gear proper, about to be described.

In carrying out my invention the steering engine or motor employed for effecting the steering when power is used is provided with a suitably chambered and ported casting or cylinder $a$, having upper and lower heads or bonnets $a'$ $a^2$, respectively. As drawn, the pressure-chamber $a^6$ of the cylinder has the form of a sector. It is provided with a suitably-packed fluid-tight movable wing or piston $c$, secured to or integral with the steering rod or shaft $b$, the latter extending in a vertical direction through said head members and having a hand steering-wheel $h$ secured to its upper end.

The forward side of the cylinder member is bored vertically or parallel with the longitudinal axis of shaft $b$ to receive the controlling-valve $d$. Said valve is arranged to open and close the two oppositely-disposed ports $a^3$ $a^3$, communicating with the valve-chest $d'$ and the pressure-chamber. Intermediate said ports and adjacent the valve the cylinder is provided with an exhaust port or passage $a^4$.

The valve $d$ is suitably packed and seated and has a vertically-extending stem $d^2$, to which is secured the operating-lever $e$. I prefer to arrange said lever so that its handle portion $e'$ is readily accessible. As drawn, it is located just below the hand steering-wheel $h$. Said lever has an elongated opening $e^2$ therein, through which the said piston's shaft or steering-rod $b$ freely passes. The said opening permits the maximum angular movement of the valve in either direction from the center or normal position. To the lower end of said shaft $b$ is secured an arm $b'$, its free end being jointed to the diagonal link $z$, before referred to. Thus all the angular movements of the steering-shaft are transmitted to the forward or steering axles.

The following is a description of the mechanism represented in the drawings for automatically closing the valve $d$: A horizontal bracket or member $f$ is mounted below said lever $e$ and has the two vertical rods $b$ $d^2$ passing freely therethrough, collars $c^2$ maintaining it in position. The bracket has oppositely-disposed arms $f^4$, having the two parallel bolts or headed rods $m'$ adjustably secured thereto. Collars $m$ are slidably mounted on the rods, the latter carrying helical springs $s$ in continuous engagement with said collars, which in turn normally abut the head portion of the rods. A pair of links $l$ are jointed at $o$ to the lever $e$ and also to the respective collars at $m^2$. The outer end of each link is slotted, as indicated at $o^2$. (See Fig. 6.) The springs when in equilibrium maintain the valve-lever in the central or normal position, as shown in Fig. 4. Now in swinging the lever a short angular distance in either direction, as in opening the valve, one of the links $l$ will be subjected to tension, thereby compressing the corresponding spring $s$, the other link at the same time moving endwise freely on its joint-pin $m^2$ and slot $o^2$. (See Fig. 6.) Upon releasing the lever the reaction of the compressed spring instantly swings it back to the central position, thereby automatically closing the valve and ports leading therefrom to the cylinder.

I prefer to provide the mechanism last described with an alarm or signal device, the same being automatically operative whenever the steering-wheel is turned to the central position corresponding, say, to the straightaway course. It is usual to provide the steering-wheel $h$ or other analogous member with an indicator or mark so arranged that when it is substantially parallel with or longitudinally of the motor-vehicle the latter, if in action, will then be moving in a straight course. In the drawings herewith the alarm device consists of a bell $i$, secured to the top of the valve-stem $d^2$, the hammer-arm $o^4$ being pivoted in a standard $f^2$, mounted on an extension $f'$ of said bracket $f$. The outer or opposite end $f^3$ of the hammer-arm is by means of a light spring $o^3$ in continuous yielding engagement with the under side of the rim of the hand steering-wheel $h$. The latter has a notch $h'$ formed therein, Fig. 2, corresponding with the said central or normal position. Now whenever the said notch of the hand-wheel is non-central the alarm or signal is silent or inoperative; but at the instant the wheel is turned so that the notch is brought adjacent or in alinement with the hammer-arm the free end of the latter springs therein, the hammer end at the same time violently striking the bell $i$. This arrangement is more especially useful and available at night-time or in dark places.

In order to maintain or impart pressure to the oil or fluid employed in the cylinder to actuate the piston $c$ and the steering-rod $b$, a suitably-located small pumping system may be used, as indicated at D, Fig. 1, wherein $n$ designates a reciprocating short-stroke pump proper actuated by power transmitted by a belt $n'$ from the revolving main engine-shaft $n^2$. The circulating fluid passes from a small pressureless tank $n^3$, via check-valve $n^4$, to the pump $n$, the latter forcing it therefrom, via check-valve $n^5$ and inlet-pipe $n^6$, to the said valve-chest $d'$ and from the latter, via one of the then open ports $a^3$, into the cylinder-chamber $a^6$, the valve $d$ meanwhile, of course, being open. At the same time the other port $a^3$ is open to the exhaust-passage $a^4$ and discharge-pipe $n^7$, the latter being in open communication with the exhaust-passage and said tank $n^3$. Thus it is clear that the pressure of the fluid upon one side of the piston will swing it the desired angular distance while the valve $d$ is open, the fluid upon the other side at the same time being correspondingly displaced and flowing unobstructedly through the correspondingly-open ports and pipe $n^7$ back to the tank, thus completing the cycle of the fluid's movements.

The valve-chest may be provided with a suitable automatic relief-valve $r$, as indicated in Fig. 3. In case the fluid is temporarily subjected to an excess pressure the valve opens, the fluid therefrom passing, via open pipe $r'$, to said tank $n^3$ until the pressure again becomes normal. I may state that whenever the valve $d$ is closed (see Fig. 3) the action of the propelling mechanism of the moving vehicle causes the fluid to then flow or circulate from the inlet-pipe $n^6$, thence through the valve-chest $d'$, relief-valve $r$, and its discharge-pipe $r'$ to the fluid-tank; but upon opening the controlling-valve $d$ the fluid then enters the piston-chamber, as before stated.

In a motor-vehicle provided with my improved steering-gear I prefer whenever its direction is to be changed that the operator first quickly swings the valve-lever $e$ to or nearly to its limit, (either to the right or left, as the case may be,) thus opening wide the corresponding port $a^3$. When the pressure of the fluid has actuated the wing or piston $c$ and its coöperating parts to swing the forward traction-wheels the desired extent or degree, (limited by adjusting-stops $c'$, if desired,) the operator then releases the lever from his grasp, at which instant the spring $s$ automatically swings the valve back to the central or closed position, thus stopping further movement of the piston until the valve is reopened.

The manual operations used in steering a self-propelled carriage equipped with my improved steering-gear are easily, quickly, and positively performed, while the device itself constitutes means for positively maintaining or locking the parts in any adjusted position within its range of movements.

While I have described my improved steering device as employing water or oil under pressure for actuating the piston, I would state that the apparatus is equally well adapted to use steam or other gaseous medium without materially changing its construction and arrangement. In motor-vehicles or self-propelled launches or motor-boats equipped with my invention and employing either fluid or steam as the propelling power the action of the steering mechanism in changing the course or direction of the vehicle or vessel and the means through which the piston's movements are manually controlled are substantially as hereinbefore described.

I claim as my invention and desire to secure by United States Letters Patent—

1. In a steering-gear for self-propelled or motor-vehicles, the combination of a steering-engine operatively connected with the steering-axle of the vehicle, a manually-actuated valve for admitting fluid under pressure to said engine and exhausting it therefrom to operate the engine and effect the steering of the vehicle, and means movable in unison with said engine so arranged that the steering may be effected by the engine itself and also by manual power independently of or combined with said engine.

2. In a steering-gear of the character described, the combination of a steering-engine operatively connected with the steering-axle of the vehicle, a manually-actuated valve for admitting fluid under pressure to said engine and exhausting it therefrom to operate the engine and effect the steering of the vehicle, means for automatically returning said valve to the central or normally closed position upon its being released by the operator, and a hand steering wheel or member positively connected and movable in unison with said engine.

3. In a steering-gear of the character described, the combination with a suitably connected and ported stationary cylinder, a wing-piston or analogous member movably mounted therein and means operatively connected with the piston for transmitting its movements to the place of use, of a manually-actuated valve for controlling the admission of steam or fluid under pressure into said cylinder to operate the piston and exhausting it therefrom, and a hand steering wheel or member secured to the piston-rod, arranged whereby the steering may be effected by the power alone and also by hand independently of or combined with said power.

4. In a steering-gear of the character described, the combination of a stationary steering-engine cylinder, a piston mounted to oscillate therein, a shaft or rod secured to said piston and extending through the two cylinder-heads, a hand steering-wheel secured to said rod, a steering-axle operatively connected with the latter, a manually-actuated valve for admitting fluid under pressure into the cylinder against the piston and exhausting it therefrom, whereby the steering of the vehicle is effected through the medium of said fluid, and means, extraneous of manual power, for imparting working pressure to the fluid and conducting the latter to and from the engine.

5. In a steering-gear of the character described, the combination of a stationary steering-engine cylinder, a fluid-actuated oscillating piston and its rod mounted therein and operatively connected with the steering-axle, means for imparting pressure to said fluid, and a manually-actuated self-closing valve for controlling the flow of the fluid to and from the engine.

6. In a steering-gear of the character described, the combination of a suitably-ported stationary cylinder or casting member, a swinging piston mounted in a chamber formed therein, a steering-rod secured to or integral with the piston and operatively connected with the steering-axle, a manually-actuated valve movably mounted in a chest communicating with said piston-chamber for controlling the flow of fluid to said piston and exhausting it therefrom, a suitably-driven pumping system for subjecting the fluid to the proper working pressure before it enters the piston and valve chambers, and means for conducting the fluid to and from said chambers.

7. In a steering-gear of the character described, the combination of a power steering-motor whose movements are actuated by fluid under pressure, a suitably-connected pumping system for imparting pressure to said fluid by means of power taken from the main propelling-engine, and a self-closing manually-actuated valve for controlling the flow of said fluid to and from the steering-motor.

8. In a steering-gear of the character described, the combination with a suitably-connected steering-motor and a manually-actuated valve for controlling the movements of the motor, of a hand steering wheel or member movable in unison with said motor, and an alarm or signal device arranged to become operative automatically when said steering wheel or member is moved into the central or normal position.

9. In a steering-gear of the character described, the combination of a suitably-ported cylinder, a piston mounted to vibrate therein, a valve in direct communication with the ports of said cylinder, a piston-rod passing through the cylinder provided with a hand steering member and operatively connected with the steering-axle, a swinging hand-lever secured to the stem of said valve, and spring-pressed links or members suitably connected with said lever and located contiguous to the piston-rod for automatically returning the lever and valve to the central or normally closed position.

10. In a steering-gear of the character described, the combination of a steering-motor having a vertically-arranged steering-shaft, a hand steering-wheel secured to the upper end of said shaft, a valve through which the motor's movements are controlled, and a spring-pressed swinging hand-lever for operating said valve having an elongated opening therein through which said steering-shaft extends.

11. In a power steering-gear for motor-vehicles, motor-boats and other self-propelled carriers, the combination of a steering-engine operatively connected with the direction-changing members of such carriers, a manually-actuated valve for controlling the flow of fluid or steam under suitable pressure to operate said engine and exhausting it therefrom, and means for instantly and automatically closing said valve at any point in the engine's stroke or movement.

Signed at Providence, Rhode Island, this 13th day of September, 1905.

JAMES H. TAYLOR.

Witnesses:
  GEO. H. REMINGTON,
  C. E. INCE.